United States Patent

Frick

[15] 3,646,538
[45] Feb. 29, 1972

[54] TRANSDUCER CIRCUITRY FOR CONVERTING A CAPACITANCE SIGNAL TO A DC CURRENT SIGNAL

[72] Inventor: Roger L. Frick, Minneapolis, Minn.
[73] Assignee: Rosemount Engineering Company, Eden Prairie, Minn.
[22] Filed: Oct. 27, 1969
[21] Appl. No.: 869,608

[52] U.S. Cl.............................................340/200, 340/177
[51] Int. Cl.......................................................G08c 19/10
[58] Field of Search..........................................340/200, 177

[56] References Cited

UNITED STATES PATENTS

| 3,246,257 | 4/1966 | Evalds | 340/200 |
| 3,299,286 | 1/1967 | Rohlnes | 340/200 X |
| 3,350,701 | 10/1967 | Bell | 340/200 X |
| 3,478,256 | 11/1969 | Tomota | 340/200 X |

Primary Examiner—Harold I. Pitts
Attorney—Dugger, Peterson, Johnson & Westman

[57] ABSTRACT

The circuitry including the variable capacitance sensor is excited by an external DC power source. A portion of the direct current power is converted to a high-frequency alternating current which is in circuit with the capacitance sensor and individual rectifying means for each of the capacitances. The rectified currents from the capacitances are compared to a reference current and the resulting signal together with a measure of all the other direct currents used by the circuit provide a signal to control the total current supplied to the circuitry. The total current then bears a prescribed and dependent relation to the capacitance of the sensor. The rectifying means form separate rectifying loops each of which is driven by an AC excitation winding. These rectifying loops are used in a special circuit configuration with a capacitance pressure sensor to provide a highly linear output signal as a function of differential pressure.

14 Claims, 1 Drawing Figure

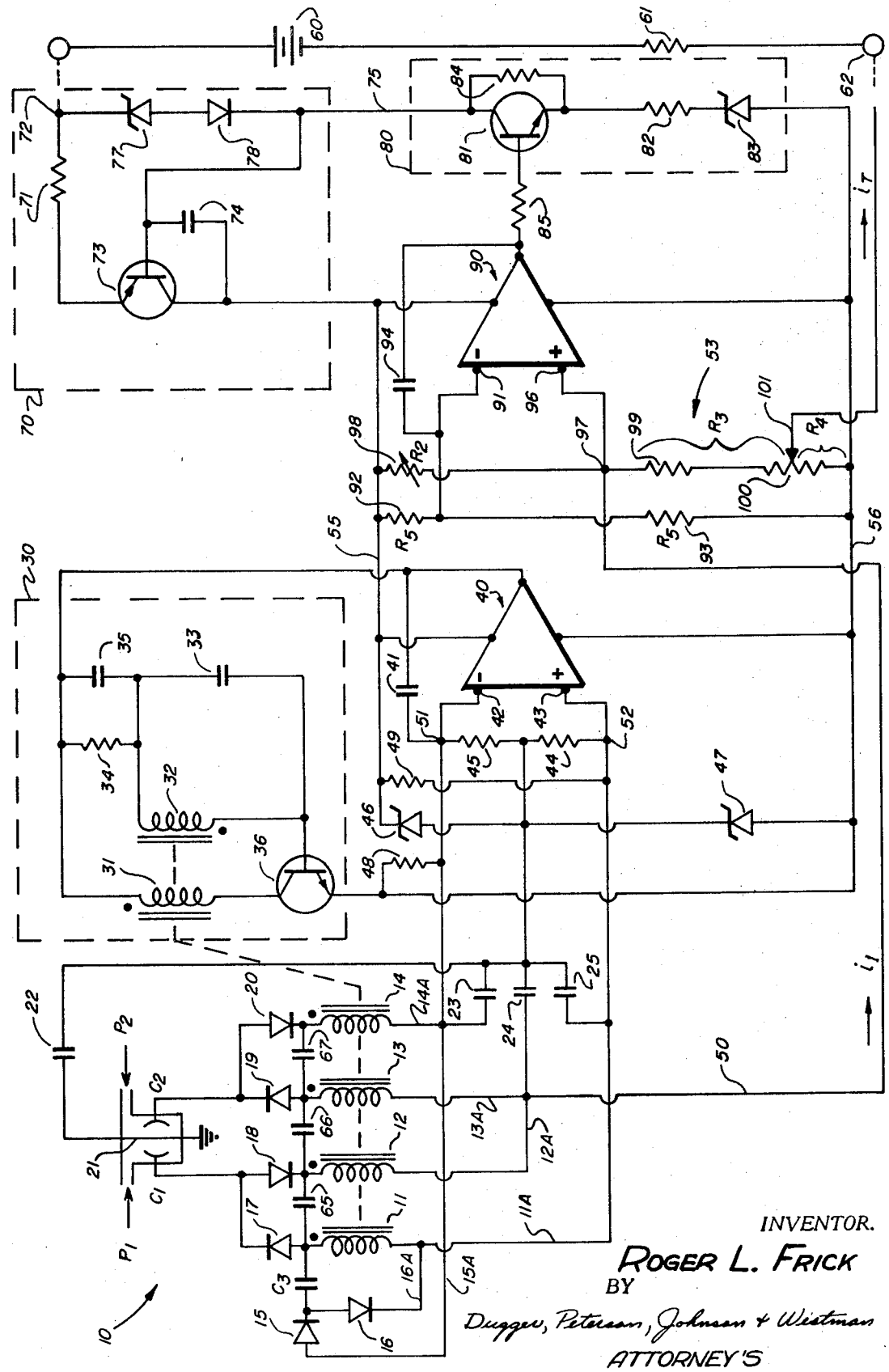

3,646,538

TELEMETERING TRANSDUCER CIRCUITRY FOR CONVERTING A CAPACITANCE SIGNAL TO A DC CURRENT SIGNAL

BACKGROUND OF THE INVENTION

1. Field of the Invention

This invention relates to capacitance measuring means which in one embodiment provides an output specially suited to a capacitance-type pressure sensor and this invention also pertains particularly to a capacitance measurement circuit which controls the total current delivered to the circuit to be a prescribed function of the capacitance means.

2. Description of the Prior Art

Capacitance sensing circuitry which provides a DC signal accurately proportional to capacitance has been described in U.S. Pat. Nos. 3,271,669 and 3,318,153. Also, circuitry which provide a control of direct current through a remote transducer as a function of a DC signal is taught in U.S. Ser. No. 661,988. Many industrial process indicators and controllers are in use which are scaled to respond to the current from a DC two-wire transmitter, so it has long been desirable to have a transducer which could convert a capacitance sensor output, such as from a capacitance pressure sensor or a capacitance liquid level sensor, to control a direct current supplied to the transducer. The required current control range is commonly required to be 4-20 milliamps, although both higher and lower ranges are also in use. The minimum current is usually on the order of 1-10 milliamps and the transducer voltage drop should generally be as low as possible so that high voltage and excessive power consumption can be avoided. The sensing devices frequently require mathematical operations to be performed on the output signal and this factor together with the requirement of an accurate current control under sometimes adverse measurement environments has prevented previous solution of the problem.

SUMMARY OF THE INVENTION

This invention comprises of at least one variable capacitance to be measured, DC activated transducer circuitry which supplies an alternating current excitation to the capacitance, and rectifying means to provide a DC signal proportional to the capacitance to be measured. Further circuit means utilizes this DC signal to control the total DC current delivered to the transducer circuitry as a function of the capacitance being measured.

Accordingly, it is an object of this invention to provide transducer circuitry which converts a variable capacitance signal into a control signal for controlling direct current for remote signaling over two-wire DC transmission means.

It is a further object of this invention to provide circuit means specially characterized to give a highly linear DC output signal from a capacitance pressure sensor having a diaphragm moving between a pair of stationary capacitance electrodes.

BRIEF DESCRIPTION OF THE DRAWINGS

The sole FIGURE is a schematic drawing of a circuit embodiment of the invention as used with a capacitance pressure sensor to provide a specialized computational function and which is used to develop a control of the total circuit current as a desired function of the capacitance.

DESCRIPTION OF THE PREFERRED EMBODIMENT

The drawing shows a schematic diagram of a circuit embodiment used in conjunction with a capacitance type differential pressure sensor shown at 10 and including a pair of variable capacitors $C_1$ and $C_2$. In addition to being a particularly useful computational circuit for a capacitance pressure sensor, this circuit embodiment illustrates the detailed operation of converting a capacitance signal to a control signal for direct current supplied to the circuit whereby this direct current is proportional to the capacitance.

OPERATION OF SENSOR PORTION OF CIRCUIT

As shown, the sensor, the capacitance of which is to be measured, is indicated generally at 10, and in this specific embodiment the measurement circuit includes three capacitors, $C_1$, $C_2$, and $C_3$. However, it should be clear that for some measurement applications the sensor may have only one active capacitor and in other instances there may be many more than three capacitors involved in the measurement. Capacitors $C_1$, $C_2$, and $C_3$ are respectively charged to opposite polarities by secondary transformer windings 11, 12, 13 and 14 which are all closely coupled in phase and amplitude and which are in circuit with the respective diodes 15, 16, 17, 18, 19, and 20. Capacitors 22, 23, 24, and 25 provide AC coupling to the capacitors $C_1$ and $C_2$ while maintaining DC isolation where required. Each of the capacitors $C_1$, $C_2$ and $C_3$ has a pair of diodes associated with it where one diode allows a charging current to flow to the capacitor in one direction, or polarity, only and the other of the two diodes allows a charging current to flow to the capacitor in an opposite direction, or polarity, only. The charging currents associated with an individual capacitor are then pulsating DC signals having an average current amplitude directly proportional to the product of applied peak voltage, frequency, and capacitance so long as the peak voltages are of sufficient duration to substantially fully charge the capacitors each cycle and neglecting the forward volt drop of the diodes. The polarity of the charging currents are defined by the diodes. Such circuitry has been previously described in U.S. Pat. Nos. 3,271,669 and 3,318,153. The currents from the capacitors $C_1$, $C_2$ and $C_3$ may be filtered and smoothed for example by capacitors 23 and 25 across their resistors 45 and 44 respectively and the currents may then be subjected to prescribed arithmetical operations as addition, subtraction, multiplication and division. Several examples of possible functions are given in the referenced patents, but the circuits disclosed herein show additional improvements as described more fully below. For this description it is necessary to realize that each combination of an AC excitation means (shown herein as transformer windings 11, 12, 13 and 14 respectively) and its associated diode and sensor capacitance provides a DC signal proportional to that capacitance. As shown, two currents flow proportional to capacitor $C_1$, one of which is a charge current having a first polarity and passing in direction through line 11A, winding 11 and diode 17 to capacitor $C_1$ and the other having a second, opposite polarity and passing in direction from capacitor $C_1$ through winding 12 and line 12A. Similar action occurs with respect to capacitor $C_2$ where line 13A connects to winding 13 and line 14A connects to winding 14. With respect to capacitor $C_3$ a current having a first polarity flows from winding 14 through line 15A and diode 15 to capacitor $C_3$ and a second current of opposite polarity flows through winding 11, line 16A and diode 16.

Excitation of the secondary windings 11-14 and thus the repetitive or cyclic charging of $C_1$, $C_2$, and $C_3$ is provided by the oscillator shown generally at 30 which has a primary winding 31. A feedback winding 32 and parallel connected capacitor 33 are shown in a conventional oscillator circuit arrangement with the phase shift components, resistor 34 and capacitor 35. The primary winding 31 is in series with the collector of transistor 36 and the output of amplifier 40. The phase shift network 34, 35 and the regenerative loop 32, 33 connect between one end of the primary winding and the base of transistor 36 for providing regenerative action for the oscillator. The frequency of this oscillator circuit is defined primarily by the output circuits comprising the transformer secondary windings and the capacitances associated therewith. In this embodiment the oscillator amplitude is controlled by amplifier 40 which is referred to as the oscillator control amplifier and which responds to direct current input signals, at least one of which comes from one of the capacitors $C_1$, $C_2$, and $C_3$.

Amplifier 40 is simply a high-gain operational amplifier which delivers an output current to the oscillator in response to a differential input signal between input terminals 42 and 43. Power is supplied from a line 55 from a current source 70.

Capacitor 41 connects between the output of amplifier 40 and the degenerative input terminal 42 to provide dynamic stability. In operation, a differential input signal to amplifier 40 is derived from at least one capacitor which is excited by the oscillator output. Accordingly, a differential input signal causes a change of voltage level to the oscillator circuit thereby changing the amplitude of the oscillator output and hence modifying the DC signal current from the driven capacitor. This "loop" is made degenerative so that the oscillator amplitude is closely controlled as a function of the capacitor. Since the DC signal which controls the amplifier output is proportional to the product of oscillator voltage and frequency and the capacitor, the resulting amplitude control is therefore a function of frequency and capacitance as well as any other DC input signal applied to the amplifier input terminals 42 and 43. In a simple case of oscillator control, for example, it might be required to simply stabilize the oscillator output against drifts in amplitude or frequency. Such an example of oscillator control is described in U.S. Pat. No. 3,271,669 and similar control could be obtained by the circuit described herein with only slight modification. Note that Zener diode 46 and series resistor 49 introduces a positive current to junction 52 which connects to amplifier input terminal 43 while Zener diode 47 and series resistor 48 introduces a negative current to junction 51 which connects to amplifier input terminal 42. Then $C_3$ could be employed to supply the stabilizing signal if the polarity of diodes 15 and 16 were reversed so that the positive current from capacitor $C_3$ would be introduced to junction 51 and the negative current would be introduced to junction 52. (The currents derived from capacitor $C_1$ and $C_2$ are assumed to be disconnected from input terminals 42 and 43 for this simple example). Then the polarities would be such that the product of oscillator frequency and amplitude would be maintained at a constant value by the amplifier control action as a function of capacitor $C_3$ and reference currents derived from Zeners 46 and 47.

The more complex embodiment shown in detail herein uses an arithmetical combination of currents from $C_1$, $C_2$, $C_3$ and from the reference supply derived from Zener diodes 46 and 47. This combination is particularly useful with a differential capacitance sensor such as the oil-filled pressure sensor which is the subject of my copending application entitled "Differential Pressure Transducer," Ser. No. 869,657, filed on even date herewith and which sensor is shown schematically in this application. Pressures $P_1$ and $P_2$ are indicated on opposite sides of a diaphragm 21. Movement of diaphragm 21 under an increase in pressure $P_2$ causes capacitance $C_2$ to decrease and capacitance $C_1$ to increase. If the stationary capacitor plates are small compared to the diaphragm or if the plates are formed somewhat as shown to conform to the shape of a deflecting diaphragm, the differential pressure $P_2-P_1$ is substantially linearly proportional to the ratio of $(C_1-C_2)/(C_1+CB\&2)$. Since capacitance is directly proportional to dielectric constant and inversely proportional to spacing between plates, it may be seen that this expression is exactly linear with respect to diaphragm motion and is independent of dielectric constant. It has further been found that because of slight nonlinearities which primarily attributed to capacitance shunts of substantially constant value, the measured differential pressure is even more closely linear to the function $(C_1-C_2)/C_1+C_2-2C_3$ where $C_3$ is independent of $C_1$ and $C_2$. Since each of the excitation windings 11, 12, 13, and 14 together with its associated diode and capacitor provides a DC signal of $\pm CVf$ depending on the relative polarity of the respective diode, it may be seen from the drawing that the current $i_1$ delivered to line 50 is equal to $(C_1-C_2)fV$. Similarly it may be seen that a zero differential input to amplifier 40 requires that $$2E/R_1 = fV(C_1+C_2-2C_3)$$

where E is the voltage across each of the Zeners 46 and 47 and $R_1$ is the resistance of each of the resistors 48 and 49. Then by combining equations the current $i_1$ on line 50 is found to be $$i_1 = \frac{2E}{R_1}\left(\frac{C_1-C_2}{C_1+C_2-2C_3}\right)$$

which is the desired function for the differential pressure sensor application. Obviously, any one of a variety of different functions of capacitance may be obtained through different combinations of the individual current sources. It may be noted that as shown all the power required for operation of amplifier 40, oscillator 30, and the Zener reference circuits may be derived solely from across lines 55 and 56.

OPERATION OF CURRENT CONTROL PORTION OF CIRCUIT

Thus far in the description of the circuit there is provided a resultant current $i_1$ which is proportional to a particular function of a reactive impedance shown specifically as a capacitor in the general case, or as capacitors $C_1$, $C_2$ and $C_3$ in the preferred embodiment, and a reference current which is derived from a pair of Zeners 46 and 47 of equal value E and resistors 49 and 48 of equal value $R_1$. Although a capacitor specifically has been illustrated above it is also possible to obtain a DC current as a function of a varying inductor with similar techniques.

In some cases, this resultant current $i_1$ may be used as a signal current for direct connection to an indicating meter or recorder. However, for common industrial measurement applications it is desirable to provide a current transmitter which is energized remotely from a DC power supply and which transmitter modifies or controls the total current flowing therethrough to be precisely proportional to a condition being measured. In this case the condition being measured is characterized by a varying capacitance and it has been shown above how this capacitance signal is converted to a current signal of desired proportionality.

The current control portion of the circuit is energized from a remote circuit comprising a DC power supply 60 and series-connected load 61. Load 61 is typically a recorder, indicator, or controller, or combination thereof. A DC current is then delivered to circuit means within the dotted lines 70 which is termed a current source since its function is to supply certain parts of the transmitter circuit with a current constrained to a certain maximum level while allowing a variable bypass current to flow to a current control stage designated at 80. Current control stage 80 is regulated by the output of a differential input operational amplifier 90 which responds to a combination of current input signal $i_1$ and the total transmitter current $i_T$. This combining of currents to provide a resultant signal as a function of $i_1$ and $i_T$ is accomplished within the network designated generally at 53.

Current source 70 comprises a resistor 71 series connected between power supply terminal 72 and the emitter of a transistor 73. The collector of transistor 73 connects to line 55, which supplies current for the aforementioned amplifiers 40 and 90 and for oscillator 30. Capacitor 74 is connected between the base and collector of transistor 73 for dynamic stability and the base of transistor 73 connects to a current bypass line 75. A series combination of Zener diode 77 and diode 78 connect from input terminal 72 to line 75. In operation Zener diode 77 maintains a substantially constant voltage across resistor 71 and hence a substantially constant current to line 55. Diode 78 provides compensation for the base to emitter voltage drop change with temperature of transistor 73.

Current control stage 80 comprises transistor 81 which has its base connected through a resistor 85 to the output of control amplifier 90. The collector to emitter circuit connects through a resistor 82 and a Zener diode 83 to line 56. A resistor 84 is connected between the collector and emitter of transistor 81 to ensure a minimal amount of current flow through line 75 even when transistor 81 is cut off. The Zener diode 83 maintains the emitter of transistor 81 at a reasonable desired voltage above line 56.

The control amplifier 90 has its negative input terminal 91 connected to a voltage reference junction between substantially equal value resistors 92 and 93 which are series connected between lines 55 and 56. A capacitor 94 is connected between the output of amplifier 90 and input terminal 91 to give dynamic amplifier stability. The amplifier positive input terminal 96 is connected to a junction 97 between the resistors 98 and 99. Resistor 98 connects to line 55 and resistor 99 connects to one end of a resistor 100. The other end of resistor 100 connects to line 56. Resistor 100 has a variable tap 101 which connects to the power return terminal 62. Resistor 98 is also shown as a variable resistor which can be used to adjust the "zero" for the circuit. The variable tap 101 on resistor 100 may be used to adjust the "gain" or "scaling" of the output equation. Line 50 which carries signal current $i_1$ also connects to junction 97.

In operation, the potential of terminal 91 is selected to be very nearly one-half of the potential between lines 55 and 56. The potential at junction 97 and hence also at the positive input terminal 96 is increased for an increasing current $i_1$. Consider the effect of an increase in pressure $P_2$ relative to $P_1$. This pressure signal moves diaphragm 21 away from the $P_2$ side giving an increased $C_1$ and a decreased $C_2$ thus giving rise to a positive current $i_1$ and positive going signal at junction 97. A positive signal at junction 97 gives a similar signal at terminal 96 which results in a positive signal at the base of current control transistor 81 and subsequent increased current through Zener 83 and a lower portion (between tap 101 and line 56) of resistor 100 (designated $R_4$). This has the effect of lowering the potential at junction 97 thereby forcing the terminal 96 to the same potential as the reference at terminal 91. The resulting relation between total current $i_T$ and current $i_1$ at balanced conditions then may be readily derived and is $$i_T = 1/R_4[(i_1 + E/R_2)(R_3R_4) - E]$$

where $R_3$ is the upper portion (between tap 101 and resistor 99) of resistor 100 plus resistor 99. The total output current $i_T$ then is directly proportional to the current signal $i_1$ which is in turn a prescribed function of the capacitance to be measured as described above.

EXAMPLE

As a specific example of operation of the circuitry disclosed herein, circuit components were selected for use with a differential pressure sensor having a change in capacitance of about 300 pf. representing a full scale pressure signal. Capacitors $C_1$ and $C_2$ individually were approximately 150 pf. when diaphragm 21 was at its normal at rest position. Capacitor $C_3$ was approximately 5 pf. and was used to compensate for fixed shunting in the sensor leads. The individual circuit component values are given in Table 1 below.

In addition to the values given in Table 1 three capacitors 65, 66 and 67, each having a value of 0.01 μf., were connected between the diode sides of windings 11, 12, 13 and 14 respectively to provide close AC tracking of those excitation windings with respect to both phase and amplitude.

With the specific component values shown and a minimum voltage supply about 22 volts between terminals 62 and 72, the total current $i_T$ can be 4-20 milliamps for a full scale pressure excursion. The current delivered by the transistor 73 to line 55 is in the order of 3.7 milliamps and is relatively independent of applied voltage at terminal 72. The instrument "-zero" may be adjusted over a wide range by means of variable resistor 98 ($R_2$) and the scale factor or "span" of the instrument may be adjusted by means of tap 101 on resistor 100 which changes the relative value of $R_3$ and $R_4$. Slight corrections in the output function between differential pressure and current $i_1$ can be modified by choice of value of capacitor $C_3$ as was discussed in the circuit description for that part of the circuitry. Power supply 60 and load resistor 61 may be located remotely from the remainder of the system with the only real restriction being that load 61 is restricted to approximately 550Ω maximum for a 20-volt DC supply at 60. These values are for a total output current of 4-20 milliamps and the overall circuit may be readily scaled for different values of current if desired.

TABLE 1

| | Symbol | Value and/or Type |
|---|---|---|
| Capacitors: | 22, 23, 24, 25, 35 | 0.1 μf. |
| | 34 | 0.0056 μf. |
| | 41, 74, 94 | 0.022 μf. |
| Resistors: | 34 | 220K |
| | 44, 45 | 500Ω |
| | 48, 49 | 40K |
| | 61, 100 | 100Ω |
| | 71 | 1.3K |
| | 82 | 50Ω |
| | 84 | 470K |
| | 85 | 10K |
| | 92, 93 | 100K |
| | 98 | 15K |
| | 99 | 9K |
| Diodes: | 15, 16, 17, 18, 19, 20, 78 | 1N914 |
| | 46, 47 | 1N4571 (6.4v.) |
| | 77 | 1N705A8 (5v.) |
| | 83 | 1N4678 (1.8v.) |
| Transistors: | 36 | 2N718 |
| | 73 | 2N5322 |
| | 81 | 2N3440 |
| Amplifiers: | 40, 90 | Fairchild 741 I.C. Operational Amplifiers |
| Transformer Windings: | 31 | Primary-50 turns |
| | 32 | Feedback-2 turns |
| | 11, 12, 13, 14 | Secondaries-250 turns quadfiler wound Core-18mm. A400 3B7-Ferroxcube |

What is claimed is:

1. A two-wire current transmitter for providing a direct current signal proportional to a condition to be measured comprising a pair of excitation terminals for connection to direct current supply means, an AC reactive impedance means which varies as a function of the condition to be measured, an oscillator means energized by current drawn through the excitation terminals and having its output coupled to the AC impedance means for applying an alternating current therethrough, current rectification means in circuit with the oscillator and AC impedance means to provide a first DC voltage signal representative of the magnitude of the AC impedance, a reference DC means which provides a second DC voltage signal independent of the variable AC impedance, a current control amplifier means having input signal terminals and providing an output control signal in response to a signal at its input terminals and which is energized by current drawn through the excitation terminals, current control means connected between the excitation terminals and controlling the current drawn therethrough in response to the control signal, a first network means, including means summing the total direct current drawn through the excitation terminals, for arithmetic comparison of the first and second voltage signals and the total direct current, and means connecting the network means to the amplifier input signal terminals so that a control signal is produced which adjusts the current through the control means to provide a prescribed relation between total direct current and the condition to be measured.

2. The transmitter of claim 1 wherein the AC impedance means is a first capacitor which varies as a function of the condition to be measured.

3. The transmitter of claim 2 further comprising a second capacitor, AC coupling means for applying an alternating current through the second capacitor from the output of the oscillator, separate current rectification means in circuit with the oscillator and second capacitor to provide a third DC voltage signal representative of the magnitude of the second capacitor, reference means providing a fourth voltage signal, a second network means for arithmetic comparison of the third and fourth voltage signals, an oscillator control amplifier energized by current drawn through the excitation terminals and having its input coupled to the third and fourth voltage signals so that the amplifier output signal is a function thereof, and means coupling the output of the oscillator control amplifier to the oscillator so that the oscillator output is controlled as a function of the third and fourth voltage signals.

4. The transmitter of claim 3 further comprising a current source providing a substantially constant value of current therethrough and being connected between one of the pair of excitation terminals and at least one of the current and oscillator control amplifiers.

5. The transmitter of claim 4 wherein the current source comprises a transistor, a control resistor in series with the transistor emitter and a current terminal so that substantially all the current delivered by the current source flows through the control resistor, and a Zener diode connected between the current terminal and transistor base to effect a substantially fixed voltage drop across the control resistor.

6. Capacitance measuring circuitry for comparing a first variable capacitor to a second capacitor comprising first and second repetitive pulse excitation means each series connected with the first capacitor, and third and fourth repetitive pulse excitation means each series connected with the second capacitor, the repetitive pulse excitation means having positive and negative pulses, the first and third excitation means providing charge currents to substantially fully charge the first and second capacitors respectively to a first polarity during each positive pulse and the second and fourth excitation means providing charge currents to substantially fully charge the first and second capacitors respectively to a second opposite polarity during each negative pulse, DC coupling means providing unidirectional current paths between the first, second, third and fourth excitation means so that the respective charge currents may be separately measured or combined in a prescribed manner to give a resultant unidirectional current signal which is a function of the magnitude of the first and second capacitors and of the frequency and amplitude of the excitation means.

7. The circuit of claim 6 wherein the first, second, third and fourth excitation means are driven from a common oscillator, means for controlling the product of oscillator amplitude and frequency comprising a direct current oscillator control signal, a first voltage reference, means for summing currents from the first and second capacitors to provide a first voltage signal proportional to their added magnitude of capacitance, means to compare the first voltage signal to the voltage reference and to adjust the level of the control signal so that the oscillator is controlled to provide a product of amplitude and frequency as a function of the first and second capacitors and the voltage reference.

8. The circuit of claim 7 wherein each of the first, second, third and fourth excitation means comprises a separate secondary transformer winding in series circuit with a separate current rectifier.

9. The circuit of claim 7 wherein the oscillator output is controlled to be directly proportional to the voltage reference and inversely proportional to the sum of the first and second capacitors, and further comprising second means to provide a second voltage signal proportional to a subtraction of currents from the first and second capacitors respectively so that the second voltage signal is directly proportional to the difference in magnitude of the first and second capacitors and is inversely proportional to the sum of magnitude of the first and second capacitors.

10. The circuit of claim 9 further comprising a third capacitor, fifth excitation means providing direct currents proportional to the third capacitor and means to combine a direct current proportional to the third capacitor with the currents proportional to the first and second capacitors to provide a modified first voltage signal which is proportional to the magnitude of the first capacitor plus the second capacitor minus the third capacitor.

11. The circuit of claim 10 wherein the oscillator and the first and second means are energized solely from direct current delivered over two-wire transmission means, and further comprising a current control stage for controlling the total current delivered over the two-wire transmission means, network means to provide a third voltage signal proportional to the total current, comparison means for comparing the second and third voltage signals and providing a fourth signal proportional to the difference thereof, and means coupling the fourth signal to the current control stage for providing a control of the total current as a function of the third voltage signal.

12. Measurement apparatus providing a direct current signal through a source and load proportional to a condition to be measured comprising a pair of excitation terminals for connection to a direct current source and load, capacitive impedance means which varies as a function of the condition to be measured, first means energized by current drawn through the excitation terminals coupled to the capacitive impedance means for applying an alternating current therethrough, second means in circuit with the first means and capacitive impedance means to provide a first DC voltage signal representative of the magnitude of the capacitive impedance, a reference DC means energized through said excitation terminals which provides a second DC voltage signal independent of the variable capacitive impedance, a current control amplifier means energized through said excitation terminals having input signal terminals and providing an output control signal at a level responsive to signals at its input signal terminals, current control means connected in circuit with the excitation terminals and connected to said current control amplifier, said current control means controlling the current through said excitation terminals in response to said control signal, a first network means including means summing the total direct current through the excitation terminals for arithmetic comparison of the first and second DC voltage signals and the total direct current, and means connecting the network means to the current control amplifier means so that a control signal is produced by said current control amplifier means which adjusts the current through the current control means to provide a prescribed relation between total direct current through said excitation terminals and the condition to be measured.

13. A remote sensing system controlling a direct current through a pair of terminals series connected to a load and power source including current supply circuit means powered by said source through said terminals, control means including a voltage reference coupled to said current supply to provide a known DC voltage source, a variable AC impedance sensor responsive to a parameter, excitation means coupled to and powered from said current supply circuit means for providing AC excitation to said variable AC impedance, rectifying means coupled to the output of said AC impedance to provide a direct current signal proportional to said AC impedance, a current control means connected across said terminals to control total current through said terminals, said current control means including amplifier means having a signal input means and having an output means regulating current flow through said current control means, and network means coupling the output of said rectifier means and said current control means to the input means of said amplifier means whereby a change in the signal from said rectifying means causes a change in amplifier output and thereby a change in current through said current control means and said terminals, said change in current being effective through said network to rebalance the signals at the input means of said amplifier means.

14. A two-wire current transmitter for providing a direct current signal proportional to a condition to be measured comprising a pair of excitation terminals for connection to direct current supply means, an AC reactive impedance means which varies as a function of the condition to be measured, a repetitive pulse excitation means energized by current drawn through the excitation terminals and having its output coupled to the AC impedance means for applying an alternating current therethrough, current rectification means in circuit with the repetitive pulse excitation means and AC impedance means to provide a first DC signal representative of the magnitude of the AC impedance, a reference DC means which provides a second DC signal independent of the variable AC impedance, a current control means having input signal terminals and providing an output control signal in response to a signal at its input terminals and which is energized by current drawn through the excitation terminals, said current control means controlling the current drawn therethrough in response to the control signal, a first network means, including means summing the total direct current drawn through the excitation terminals, for arithmetic comparison of the first and second DC signals and the total direct current, and means connecting the network means to the current control means so that a control signal is produced which adjusts the current through the current control means to provide a prescribed relation between total direct current and the condition to be measured.

* * * * *

PO-1050
(5/69)

UNITED STATES PATENT OFFICE
CERTIFICATE OF CORRECTION

Patent No. 3,646,538        Dated February 29, 1972

Inventor(s) Roger L. Frick

It is certified that error appears in the above-identified patent and that said Letters Patent are hereby corrected as shown below:

Column 3, line 54, the quantity $(C_1 + CB\&2)$ should read $(C_1 + C_2)$; Column 3, line 59, after "which" insert --are--; Column 3, line 62, the quantity $C_1 + C_2 - 2C_3$ should read $(C_1 + C_2 - 2C_3)$; Column 3, at the end of line 62, insert a period. Column 5, line 31, the quantity $(R_3 R_4)$ in the equation should read $(R_3 + R_4)$.

Signed and sealed this 15th day of August 1972.

(SEAL)
Attest:

EDWARD M. FLETCHER, JR.        ROBERT GOTTSCHALK
Attesting Officer        Commissioner of Patents